Figure 1:
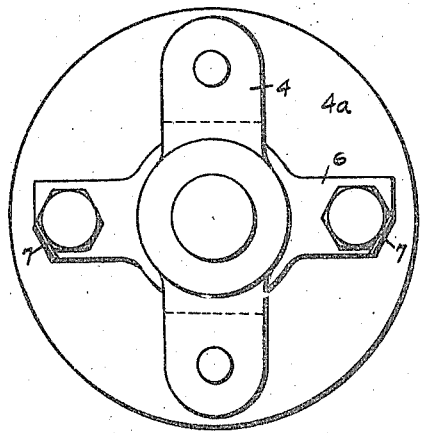
Figure 2:
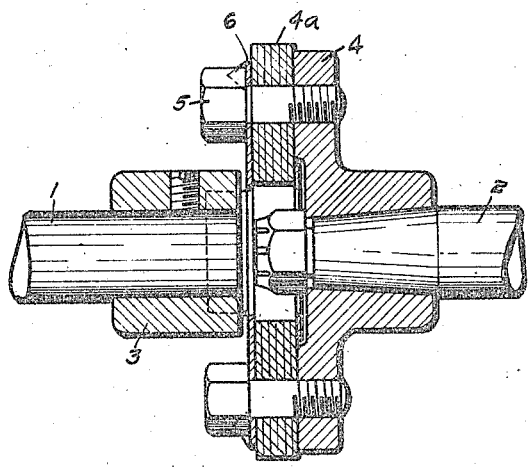

F. R. BLAIR.
FLEXIBLE COUPLING.
APPLICATION FILED JAN. 9, 1917.

1,233,173.

Patented July 10, 1917.

INVENTOR
F. R. Blair
BY
Dull, Crawfald & Dull
ATTORNEY

UNITED STATES PATENT OFFICE.

FRANK ROSS BLAIR, OF GLEN RIDGE, NEW JERSEY, ASSIGNOR TO F. R. BLAIR & CO., INC., OF NEW YORK, N. Y., A CORPORATION OF NEW YORK.

FLEXIBLE COUPLING.

1,233,173.

Specification of Letters Patent.

Patented July 10, 1917.

Application filed January 9, 1917. Serial No. 141,354.

*To all whom it may concern:*

Be it known that I, FRANK ROSS BLAIR, a citizen of the United States, residing at Glen Ridge, in the county of Essex and State of New Jersey, have invented certain new and useful Improvements in Flexible Coupling, of which the following is a full, clear, and exact description, such as will enable others skilled in the art to which it appertains to make and use the same.

This invention relates to power transmission mechanism, and with respect to its more specific features, to flexible couplings adapted to serve as torque transmitting devices.

One of the objects of the invention is the provision of a flexible coupling adapted to efficiently transmit the torque.

Another object is to provide means efficiently to attach the disk to the driving and driven members and to prevent the loosening of such attachment, while at the same time reducing the cost and labor of manufacturing.

Other objects will be in part obvious and in part pointed out hereinafter.

The invention accordingly consists in the features of construction, combinations of elements and arrangement of parts ich will be exemplified in the construction hereinafter set forth, and the scope of the application of which will be indicated in the following claims.

Referring now more specifically to the drawings, the numeral 1 indicates a rotatable driving shaft, and the numeral 2 a rotatable driven shaft coaxial therewith. These shafts may be regarded as pertaining to any form of rotary power transmitting device, as, for instance, the power transmission shaft between the motor and the axle gears of an automobile, wherein it is not uncommon to support the driving shaft 1 in such a manner that its plane of rotation moves or vibrates angularly relative to the plane of rotation of the driven shaft 2. For the purpose of transmitting torque from one shaft to the other a driving member is provided on each shaft with an intermediate flexible torque transmitting element between them. Each of the driving members is connected to the torque transmitting element in such a manner as to produce a tractive effect at circumferentially spaced points around the elements, but in order to permit a certain variation in the position of the axes of the two shafts, the tractive points at which the one driving element is connected to the torque transmitting element are circumferentially spaced from the tractive points at which the other driving element is connected to the torque transmitting element, each shaft is provided with arms or cranks 3 and 4, forming spiders of several arms each, in the present instance two. A flexible annular driving disk 4ª is provided to which the spider arms are connected, as by bolts 5, which are preferably tapped into the arms of the spiders, the points of connection of one spider to the disk alternating with those of the other around the disk. When the shaft 1 is rotated, the shaft 2 will be driven through the instrumentality of the flexible disk, and the disk permits angular variation or movement of the axis of rotation of the shafts and arms relative to each other while still transmitting the torque.

With a flexible coupling of this construction it is more desirable that the strain of the torque shall be taken by the pressure of the parts on the surface of the disk rather than on the edges of the openings. To insure this, means are provided to insure uniform pressure of the head of the bolt over a substantial part of the area of the disk, and to prevent the loosening of the attaching means under the influence of the jar and vibration of use. In order to accomplish this, washers are placed under the heads of the bolts 5 which are of such form as shown at 6 that one washer will engage attaching means on more than one arm. By this construction, the washer is positively prevented from turning on the bolts, so that the bolts may be positively prevented from turning by means on the washer, as, for example, by bending one edge or corner of the washer up against a flat face on the head of the bolts. Where the spiders have two arms each, as in the form illustrated, these washers will conveniently extend diametrically across the disk, and have, if desired, a central opening coaxial with the disk, whereby if either of the shafts or the means for securing either of the shafts to the spider, should extend inwardly beyond the plane of the washers, no interference would take place, and ready access may be had to the securing means for one shaft when the spider for the other has been removed.

By this construction, there is provided for each disk, a single member which serves to distribute the pressure of the attaching means of a plurality or all the arms over the surface of the disk, and which absolutely prevents the loosening of the bolts by locking them against a member which is itself absolutely locked against rotation.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. A device of the character described comprising, in combination, a driving member and a driven member, each comprising a spider having arms, a flexible disk, means for attaching said disk to said arms, and single means for preventing the loosening of the attaching means of a plurality of arms of one spider.

2. A device of the character described comprising, in combination, a driving member and a driven member, each comprising a spider having arms, a flexible disk, means for attaching said disk to said arms, with the arms of one spider alternating with those of the other around the disk, and single means for preventing the loosening of the attaching means of a plurality of arms of one spider.

3. A device of the character described comprising, in combination, a driving member and a driven member, each comprising a spider having arms, a flexible disk, bolts for attaching said arms to said disk with the arms of one spider alternating with those of the other around the disk, and a single washer on bolts on each of a plurality of arms of one spider, said washer being provided with means to prevent loosening of the bolts.

4. A device of the character described comprising, in combination, a driving member and a driven member, each comprising a spider having arms, a flexible disk between the said spiders, bolts for attaching said arms to said disk with the arms of the one spider alternating with those of the other around the disk, and a single washer on bolts on each of a plurality of arms of one spider, said washer being provided with portions bent up against flat faces of the heads of said bolts to prevent rotation of the bolt to loosen the same.

5. A device of the character described comprising, in combination, a driving member and a driven member, each comprising a spider with two diametrically opposing arms, a flexible disk, means for attaching said disk to said arms with the arms of one spider alternating with those of the other around the disk, comprising bolts, and means engaging the bolts on both arms of one spider for preventing the loosening of said attaching means.

6. A device of the character described comprising, in combination, a driving member and a driven member, each comprising a spider with two diametrically opposing arms, a flexible disk, means for attaching said disk to said arms with the arms of one spider alternating with those of the other around the disk, comprising bolts, and a washer engaging the bolts on both arms of one spider for preventing the loosening of said attaching means, said washer having portions engaging flat faces of the heads of the said bolts to prevent turning of the bolts to loosen the same.

7. A device of the character described comprising in combination, two driving members, a flexible torque transmitting element, means adapted to cause a tractive effect between each of said members and said torque transmitting element at circumferentially spaced points around the element, by pressure on the face of the element, comprising clamping members connected to said driving members respectively, said clamping members comprising rotative parts, and a locking element adapted to lock mutually at least two of said rotative parts at different of said tractive points.

8. A device of the character described, comprising in combination, two driving members, a flexible torque transmitting element, means adapted to cause a tractive effect between each of said members and said torque transmitting element at circumferentially spaced points around the element, including attaching means having rotative parts and a locking element adapted to lock mutually at least two of said rotative parts at different of said tractive points.

In testimony whereof I affix my signature, in the presence of two witnesses.

FRANK ROSS BLAIR.

Witnesses:
H. M. SEAMANS,
WILLIS B. RICE.